United States Patent
Ryan et al.

(10) Patent No.: US 10,995,896 B2
(45) Date of Patent: May 4, 2021

(54) SEALING METHOD, APPARATUS AND SYSTEM

(71) Applicants: Southern Gas Networks PLC, Horley (GB); Scotland Gas Networks PLC, Edinburgh (GB); Scotia Gas Networks LTD, Horley (GB)

(72) Inventors: Nicholas John Ryan, Gloucestershire (GB); Iain Beveridge Chirnside, Aberdeenshire (GB); Angus McIntosh, Edinburgh (GB)

(73) Assignees: Southern Gas Networks PLC, Horley (GB); Scotland Gas Networks PLC, Edinburgh (GB); Scotia Gas Networks Limited, Horley (GB)

( * ) Notice: Subject to any disclaimer, the term of this patent is extended or adjusted under 35 U.S.C. 154(b) by 577 days.

(21) Appl. No.: 15/737,439

(22) PCT Filed: Jun. 17, 2016

(86) PCT No.: PCT/GB2016/051824
§ 371 (c)(1),
(2) Date: Dec. 18, 2017

(87) PCT Pub. No.: WO2016/203261
PCT Pub. Date: Dec. 22, 2016

(65) Prior Publication Data
US 2018/0195659 A1    Jul. 12, 2018

(30) Foreign Application Priority Data

Jun. 18, 2015 (GB) .................................... 1510734

(51) Int. Cl.
*F16L 55/1645* (2006.01)
*F16L 55/18* (2006.01)
(Continued)

(52) U.S. Cl.
CPC ........... *F16L 55/1645* (2013.01); *F16L 13/11* (2013.01); *F16L 55/16455* (2013.01); *F16L 55/18* (2013.01); *B05D 3/067* (2013.01)

(58) Field of Classification Search
CPC . F16L 55/1645; F16L 55/16455; F16L 55/18; F16L 55/26; F16L 2101/16;
(Continued)

(56) References Cited

U.S. PATENT DOCUMENTS 3,315,017 A * 4/1967 Kemp ................. F16L 55/1645
                                                        264/36.17
3,606,913 A * 9/1971 Yie ..................... F16L 55/1645
                                                        138/97

(Continued)

FOREIGN PATENT DOCUMENTS

DE         4232059 A1    3/1994
DE        19601041 A1    7/1997
(Continued)

OTHER PUBLICATIONS

Machine Translation of DE19601041A1, available espace.net (Year: 1997).*
(Continued)

*Primary Examiner* — Nicholas L Foster
(74) *Attorney, Agent, or Firm* — Kenneth E. Horton; Kirton McConkie

(57) ABSTRACT

A sealing method, comprising: introducing a moving stream of curable material into an opening; and curing a portion of the moving stream of curable material flowing back out of the opening to form a cured layer of curable material. The cured layer restricts or prevents at least a further portion of the curable material from flowing back out of the opening.

13 Claims, 12 Drawing Sheets

(51) Int. Cl.
  *F16L 13/11* (2006.01)
  *B05D 3/06* (2006.01)

(58) Field of Classification Search
  CPC ..... F16L 2101/60; F16L 13/106; F16L 13/11; B05D 3/067
  See application file for complete search history.

(56) References Cited

U.S. PATENT DOCUMENTS

| | | | | |
|---|---|---|---|---|
| 4,370,113 | A * | 1/1983 | Nakashin | F16L 55/18 104/138.2 |
| 4,582,551 | A * | 4/1986 | Parkes | F16L 55/16455 138/97 |
| 4,584,963 | A * | 4/1986 | Morinaga | F16L 55/18 118/105 |
| 4,632,944 | A * | 12/1986 | Thompson | C09J 4/00 522/11 |
| 4,687,677 | A * | 8/1987 | Jonasson | F16L 55/18 427/8 |
| 4,813,714 | A | 3/1989 | Fairey et al. | |
| 6,966,950 | B2 * | 11/2005 | Winiewicz | B05B 13/0636 118/215 |
| 10,099,251 | B2 * | 10/2018 | Kersey | F16L 58/1027 |
| 2003/0039752 | A1 * | 2/2003 | Winiewicz | F16L 55/32 427/236 |
| 2006/0112996 | A1 * | 6/2006 | Poole | F16L 55/1645 138/97 |
| 2011/0151202 | A1 | 6/2011 | Feinstein et al. | |
| 2013/0064967 | A1 | 3/2013 | Feinstein et al. | |
| 2014/0140228 | A1 | 5/2014 | Dayanandan et al. | |
| 2015/0140228 | A1 * | 5/2015 | Kersey | B05D 7/222 427/512 |
| 2017/0234476 | A1 * | 8/2017 | Kersey | B05D 3/067 427/553 |

FOREIGN PATENT DOCUMENTS

| | | | |
|---|---|---|---|
| EP | 0126648 | A2 | 11/1984 |
| EP | 3311059 | A1 | 4/2018 |
| GB | 1331602 | A | 9/1973 |
| GB | 1378003 | A | 12/1974 |
| GB | 1500241 | A | 2/1978 |
| GB | 2142703 | A | 1/1985 |
| GB | 2160289 | A | 12/1985 |
| GB | 2184810 | A * | 7/1987 .......... F16L 55/1645 |
| GB | 2226865 | A | 7/1990 |
| GB | 2287763 | A * | 9/1995 .......... F16L 55/1645 |
| WO | 2004102060 | A1 | 11/2004 |
| WO | 2016203261 | A1 | 12/2016 |

OTHER PUBLICATIONS

European Patent Office, Office Action, Application Serial No. 16731298.2, dated Mar. 19, 2020 (7 pages).
Marotta, Advancements in Light Cure Adhesive Technology, Medical Market Development Manager for Henkel Corporation, pp. 1-7.
Permabond Products Catalog, pp. 1-28.
http://www.techsil.co.uk/vitralit-4282-2-20gm-uv-adhesive.
http://www.cyberbond1.com/adhesives/uv-curing-adhesives.aspx.
http://www.techsil.co.uk/media/pdf/TDS/PNVI00011-tds.pdf.
http://www.ellsworthadhesives.co.uk/products/adhesive/uv-curing.html?gclid=CNL-oqOZqsUCFSYYwwodQLMANw.
https://www.dymax.com/index.php/adhesives/products/9482.
http://www.humiseal.com/products/uv-curable-type-ar-ur/us40/.
http://www.chemence.com/downloads/tds/UV-Curing4.

* cited by examiner

SEALING METHOD, APPARATUS AND SYSTEM

FIELD OF THE INVENTION

The present invention relates to a sealing method, apparatus and system. Further aspects of the present invention relate to a method and apparatus for delivering a curable material.

BACKGROUND

Pipeline systems for delivering fluids, such as gas and water distribution networks, incorporate a large number of pipe joints. Gas pipeline systems, for example, frequently employ pipe lengths which are as short as 9 feet (2.74 m) long, meaning that a large number of joints are required to form the individual pipe lengths into a useable network.

The vast majority of pipe joints utilise a socket and spigot method, as shown in FIG. 1, in which a spigot 1 formed at an end of a first pipe 2 is inserted into a socket 3 of enlarged diameter formed at an adjacent end of a second pipe 4.

Another commonly-used pipe joint, known as a collar joint, is shown in FIG. 2. This type of joint involves spigots 5, 6 formed at the ends of adjacent pipes 7, 8 being inserted into either end of a double ended socket or collar 9, so as to join the pipes 7, 8 together.

A number of pipe joint sealing methods have been proposed, with the aim of preventing fluids in the pipeline from leaking at the pipe joints. For many years (in the UK, at least) gas pipeline networks employed cast iron pipes with lead-yarn sealed joints. An example of this type of seal is shown in FIG. 3. This type of seal is formed by first forcing a layer of yarn 10 into the circumferential cavity C present in the joint 11 between the spigot of a first pipe 12 and the socket of a second pipe 13. After the yarn 10 is in place, molten lead is poured into the gap in the joint 11, and allowed to set to form a further lead seal layer 14.

Previously, moisture in the gas carried by the pipeline kept the yarn of lead-yarn sealed joints moist and swollen (thus preserving the integrity of the seal). However, the changeover of UK gas supplies to North Sea gas in the 1960s resulted in a change to a "dry" gas product, without the previous levels of moisture, which has led to the shrinking of the yarn and subsequent leakage of gas from the joints.

Mechanical joints incorporating an elastomeric layer 15 (see FIG. 4) which is compressed within the joint have since been increasingly employed to seal joints in cast iron and steel pipelines. The elastomeric seals in mechanical joints are however prone to hardening and cracking, resulting in leakage over time. Such leakage in utilities pipework is endemic throughout the UK and indeed the world.

Pipe joints are also typically subjected to movement in service. One source of movement results from thermal expansion and contraction of the pipes, for example owing to changes between summer and winter temperatures. Another source of movement stems from the fact that pipelines are frequently routed under roads and streets, meaning that they are subject to significant and variable loading due to road traffic running over the route of the pipes. This loading subjects the pipe joints to rotational movement (i.e. joint bending) and longitudinal movement in service. As will be appreciated, pipe joint movement, from sources such as thermal expansion and traffic loading, can result in further joint seal damage and leakage over time. The malleable nature of the lead sealing layer of a lead-yarn sealed joint renders it particularly susceptible to degradation from joint movement, as it will not return to its original shape after deformation caused by joint movement.

Leaking joints naturally present concerns to pipeline operators in terms of revenue losses, as well as potential pollution and safety issues. Leakage from compromised joints may also detrimentally add to the carbon footprint of a pipeline operator, for example where the operator is a gas supplier. Methods have therefore been proposed to repair leaking pipe joint seals.

Currently, pipe joint seal repair is conducted by excavating the pipeline at the joint, drilling into the joint at specific locations and then injecting a sealant into the joint, which cures to form a blockage in the body of the joint. This technique has now been developed to include keyhole excavation techniques to minimise disruption, in which only a localised "core" of earth is extracted from the ground to expose the pipe joint at the desired repair point.

Internal robotic deployment of sealant is now also being carried out to repair point joints. This technique employs a pipe crawling robot, which is used to travel through the pipe network and then drill into the body of the joint from the inside of the pipe, before injecting sealants into the joint cavity to repair the joint seal.

All of these joint repair techniques require mechanical intervention into the joint itself, however, and as such disturb the joint and surrounding area during the repair operation. This disturbance can itself potentially cause additional problems, observed after the repair as the pipeline re-settles over time. Further, these methods are time consuming and risk potentially introducing additional leak paths into the system, for example in the event of a pipe cracking during the joint drilling process. Also, in the case of a collar joint it is very unlikely that the collar will be central to the joint. This can make drilling from the inside too risky, due to the possibility of drilling out of the pipe wall, potentially creating a new leak. Yet further, existing joint repair techniques can lead to sealant material dripping down and collecting at the bottom of the pipe, to the detriment of free fluid flow in the pipes.

Similar issues apply to the repair of other leak sources in pipelines, such as cracks and other openings in the pipeline wall, which may for example extend longitudinally along the pipeline (rather than around the circumference of the pipeline, as is typically the case for a pipe joint).

Aspects of the present invention seek to address problems associated with the prior art. It will however be appreciated that embodiments of the present invention may be applied to situations other than the repair of pipelines. For example, embodiments of the present invention may for example be employed to seal joints or other desired areas of a pipeline during its initial manufacture, rather than in a repair process. Yet further, embodiments may for example be applied to the manufacture and/or repair of seals, cracks holes or other openings in structures and articles other than pipelines.

According to a first aspect of the present invention, there is provided a sealing method, comprising:
a. introducing a moving stream of curable material into an opening; and
b. curing a portion of the moving stream of curable material flowing back out of the opening to form a cured layer of curable material, wherein the cured layer restricts or prevents at least a further portion of the curable material from flowing back out of the opening.

Preferably, said curing comprises applying electromagnetic radiation to the portion of the moving stream of curable material flowing back out of the opening.

Preferably, the curable material comprises light-curable material, and said applying electromagnetic radiation comprises irradiating the portion of the moving stream of light-curable material flowing back out of the opening with light to form the cured layer of light-curable material.

Preferably, the light-curable material comprises a light-curable sealant or light-curable adhesive.

Preferably, the moving stream of curable material is introduced into the opening using at least one nozzle.

Preferably, at least one light source is provided adjacent the at least one nozzle to locally irradiate the portion of the moving stream of light-curable material in the vicinity of the at least one nozzle.

Preferably, the at least one light source and the at least one nozzle are provided on a single body or are attached to each other.

Preferably, introducing the moving stream of light-curable material into the opening comprises using the at least one nozzle to introduce a moving stream of light-curable material into the opening in turn at plural locations of the opening, and wherein the method further comprises moving the at least one nozzle and the at least one light source between the plural locations.

Preferably, the at least one nozzle comprises a plurality of nozzles, the at least one light source comprises a plurality of light sources, and each one of the plurality of light sources is provided adjacent a respective one of the plurality of nozzles to irradiate an area in the vicinity of its respective one of the plurality of nozzles.

Preferably, at least one light source is provided to irradiate the entire opening.

Preferably, the moving stream of light-curable material is introduced into the opening at a single location of the opening to form a cured layer around the entire opening.

Preferably, the opening comprises the opening of a joint on an interior side of a pipeline, and the single location is at the bottom of the pipeline interior.

Preferably, the light-curable material comprises a UV-light curable material, and the light comprises UV light.

Preferably, the irradiating is such that the moving stream of light-curable material flowing back out of the opening is irradiated with UV light at an intensity of 30 W/cm$^2$ or less, and more preferably 100 mW/cm$^2$ or less.

Preferably, the curing is such that the cured layer of curable material is formed in five seconds or less, and more preferably between two and five seconds or in under two seconds.

Preferably, the method further comprises introducing additional curable material into the opening after the cured layer has been formed.

Preferably, the opening comprises an opening of a joint between two or more components.

Preferably, the opening leads to a cavity within the joint.

Preferably, the joint comprises a pipe joint joining pipes of a pipeline and the opening comprises an opening of the pipe joint, wherein the opening is present between the pipes.

Preferably, the opening leads to a cavity within the pipe joint.

Preferably, the opening comprises a crack in a surface.

Preferably, the opening comprises a crack, hole or gap in a surface or a gap between two surfaces.

Preferably, the opening is present on an interior side of a or the pipeline, and said introducing comprises introducing a moving stream of light-curable material into the opening from within the pipeline.

Preferably, said irradiating comprises irradiating the portion of the moving stream of light-curable material with light from at least one light source located within the pipeline.

Preferably, the curable material has a viscosity below 3000 cP, and more preferably 1500 cP or less.

Preferably, said curing is performed using a first curing process, and the curable material is also curable by at least one additional curing process.

Preferably, the at least one additional curing process is slower acting than the first curing process.

Preferably, the at least one additional curing process comprises one or more of an anaerobic curing process, a moisture-based curing process, a heat-based curing process or a curing process which is triggered by the addition of one or more additional chemical components and/or activators to the curable material.

Preferably, the at least one additional curing process is catalysed by metal ions.

Preferably, the opening is provided in a metal body or structure, and the method further comprises removing corroded material from a surface of the metal body or structure and mixing the corroded material with the curable material prior to said introducing a moving stream of curable material into the opening.

Preferably, the method is employed to repair a previously provided seal of the opening.

Preferably, the method is employed to provide a seal of the opening as part of a manufacturing process of an article or structure which includes the opening.

Preferably, the at least one nozzle comprises a plurality of nozzles.

According to a second aspect of the present invention, there is provided sealing apparatus, comprising:
a. at least one outlet which is operable to introduce a moving stream of curable material into an opening; and
b. curing means operable to cure a portion of the moving stream of curable material flowing back out of the opening to form a cured layer of curable material which restricts or prevents at least a further portion of the curable material from flowing back out of the opening.

Preferably, the curing means comprises at least one source of electromagnetic radiation.

Preferably, the at least one source of electromagnetic radiation comprises at least one light source which is operable to irradiate the portion of the moving stream of curable material flowing back out of the opening to form the cured layer of curable material.

Preferably, the at least one light source is provided adjacent the at least one outlet to locally irradiate an area in the vicinity of the at least one outlet.

Preferably, the sealing apparatus further comprises a body on which the at least one outlet and the at least one light source are provided.

Preferably, the at least one outlet and the at least one light source are attached to each other.

Preferably, the at least one outlet comprises a plurality of outlets, the at least one light source comprises a plurality of light sources, and each one of the plurality of light sources is provided adjacent a respective one of the plurality of outlets to irradiate an area in the vicinity of its respective one of the plurality of outlets.

Preferably, the at least one light source is operable to irradiate the entire opening.

Preferably, the curable material comprises a UV-light curable material and the at least one light source comprises at least one UV light-emitting light source.

Preferably, the at least one light source is arranged such that the portion of the moving stream of light-curable material is irradiated with UV light at an intensity of 30 W/cm$^2$ or less, and more preferably 100 mW/cm$^2$ or less.

Preferably, the curing means is arranged such that the cured layer of curable material is formed in five seconds or less, and more preferably between two and five seconds or in under two seconds.

Preferably, the at least one outlet is further operable to introduce additional curable material into the opening after the cured layer has been formed.

Preferably, the opening comprises an internal pipe joint opening of a pipeline, and the apparatus is arranged to be located within the pipeline.

Preferably, the at least one outlet comprises a plurality of outlets.

According to a third aspect of the present invention, there is provided a sealing system, comprising:
a. sealing apparatus according to the above-mentioned second aspect;
b. a movable platform which carries the sealing apparatus; and
c. a sealant supply system to supply curable material to the movable platform.

Preferably, the movable platform and sealing apparatus are arranged to be located within a pipeline.

Preferably, the opening comprises an internal pipe joint opening of the pipeline, and the movable platform is provided with means to move the at least one outlet of the sealing apparatus around the pipe joint opening.

Preferably, the opening comprises an internal pipe joint opening of the pipeline, and the movable platform is arranged to insert the at least one outlet of the sealing apparatus into the internal pipe joint opening at the bottom of the pipeline.

Preferably, the opening comprises a crack in an interior surface of the pipeline, and the movable platform is provided with means to move the at least one outlet of the sealing apparatus into the vicinity of the crack.

Preferably, the movable platform is movable in accordance with control signals transmitted to the movable platform from a remote location.

Preferably, the sealant supply system comprises a pump and an umbilical.

Preferably, the system is provided with a camera and/or sensor arrangement to identify the location of the opening.

According to a fourth aspect of the present invention, there is provided a method of delivering curable material, comprising:
a. producing a moving stream of curable material; and
b. selectively forming a cured layer of curable material to direct the movement of the curable material.

Preferably, said curable material comprises light-curable material, and said selectively forming comprises irradiating at least a portion of the moving stream of light-curable material with at least one light source to selectively form the cured layer.

Preferably, the method further comprises varying the intensity of the at least one light source to selectively form the cured layer.

Preferably, the at least one light source comprises a plurality of light sources, and wherein the intensities of the plurality of light sources are varied to selectively form the cured layer.

Preferably, producing the moving stream of curable material comprises extruding a stream of curable material from a nozzle, wherein the cured layer directs the movement of the stream.

According to a fifth aspect of the present invention, there is provided curable material delivery apparatus, comprising:
a. at least one outlet arranged to produce a moving stream of curable material; and
b. curing means arranged to selectively form a cured layer of curable material, wherein the cured layer is selectively formed to direct the movement of the curable material.

Preferably, the curing means comprises at least one light source arranged to irradiate at least a portion of the moving stream of light-curable material to selectively form the cured layer.

Preferably, the intensity of light output by the at least one light source is variable.

Preferably, the at least one light source comprises a plurality of light sources located at different positions relative to the at least one outlet.

Preferably, the intensity of light output by each of the plurality of light sources is independently variable.

In order that the present invention may be more readily understood, embodiments thereof will now be described, by way of example only, with reference to the accompanying drawings, of which:

Figure 12:
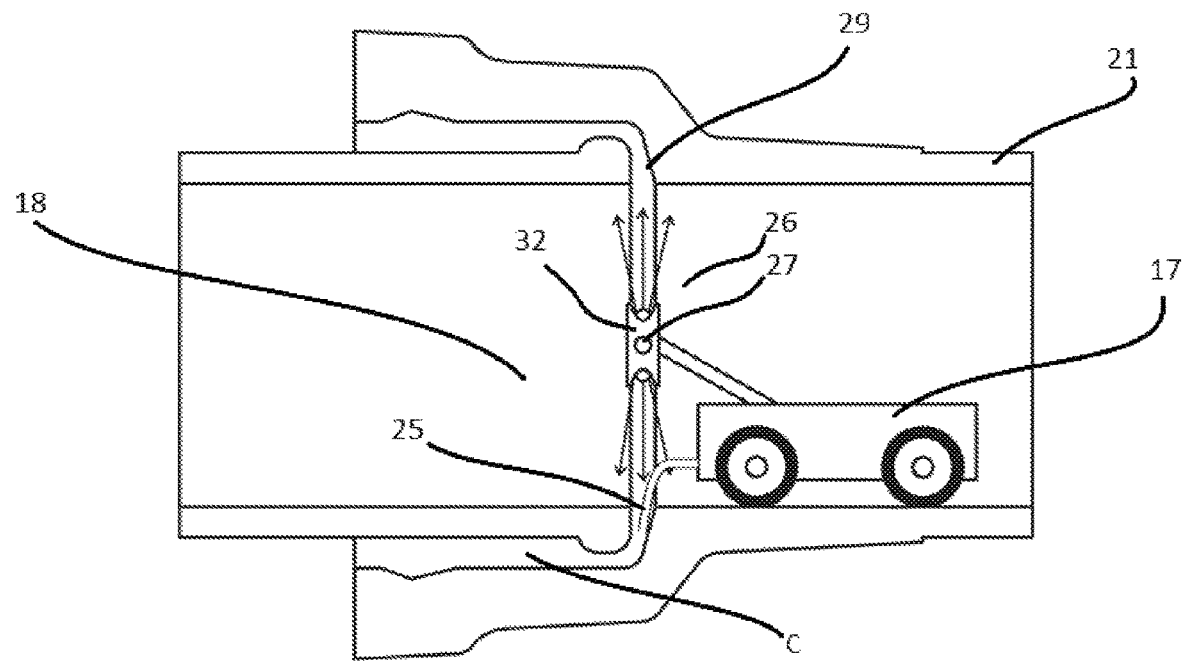
Figure 13:
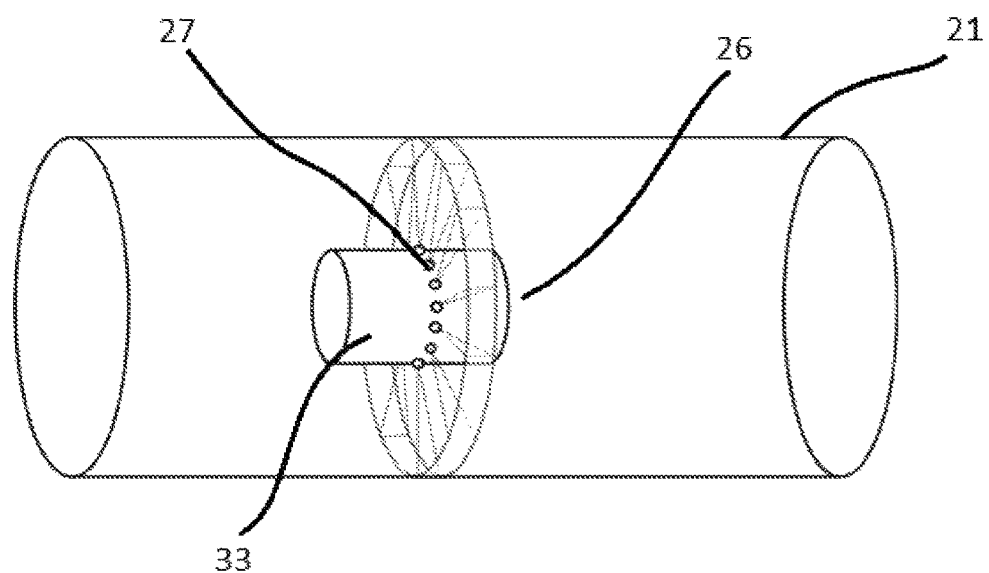
Figure 14:
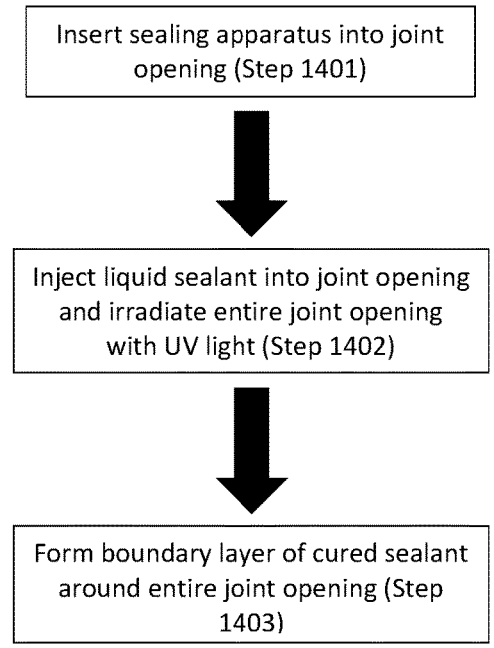
Figure 16:
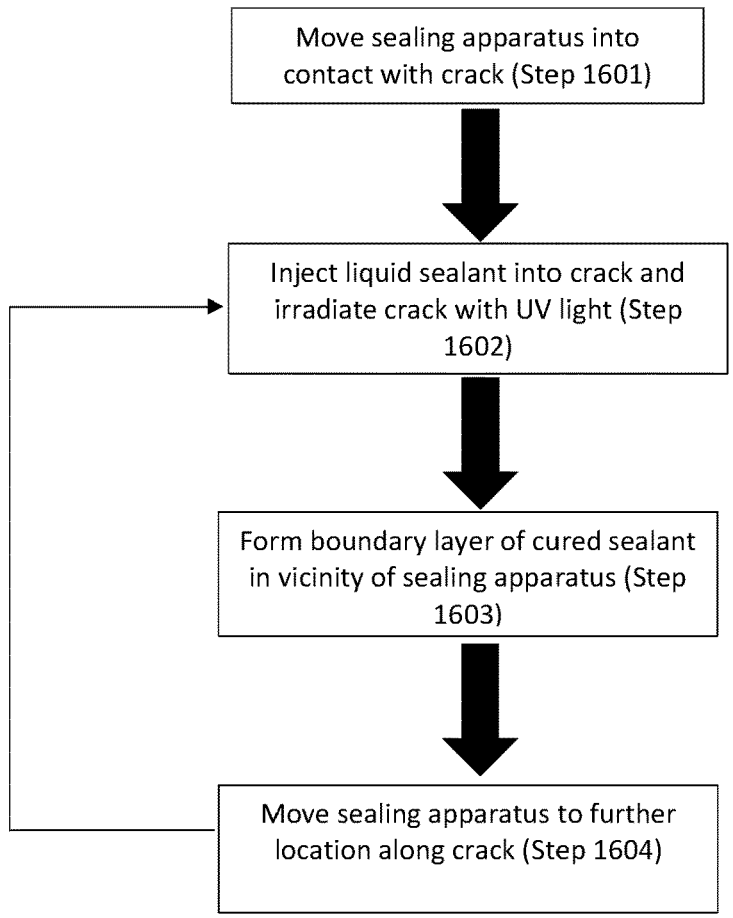
Figure 17:
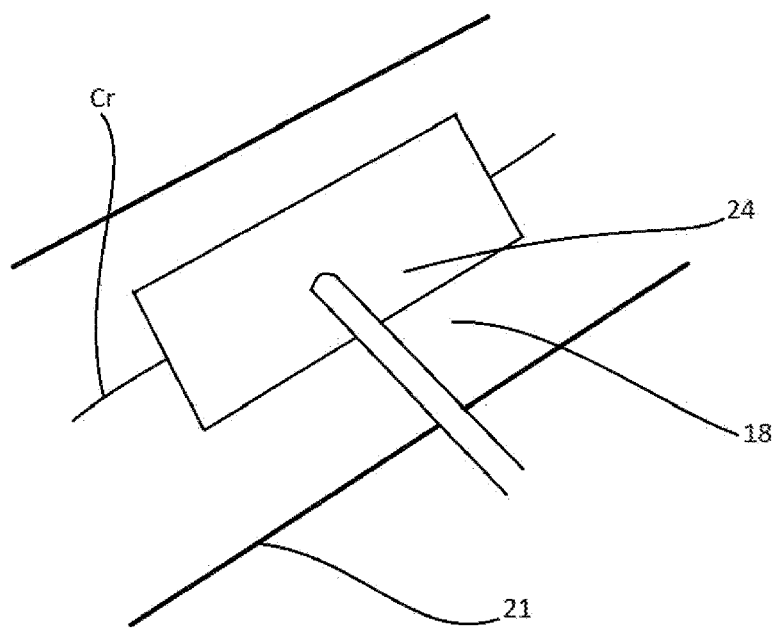
Figure 18A:
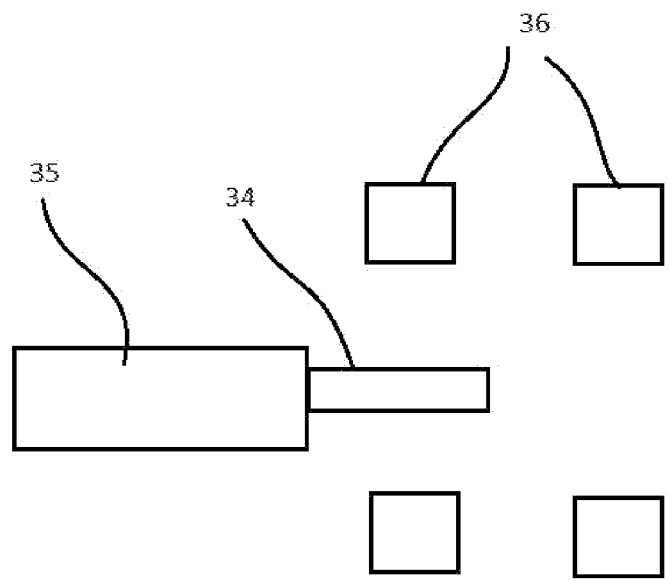
Figure 18B:
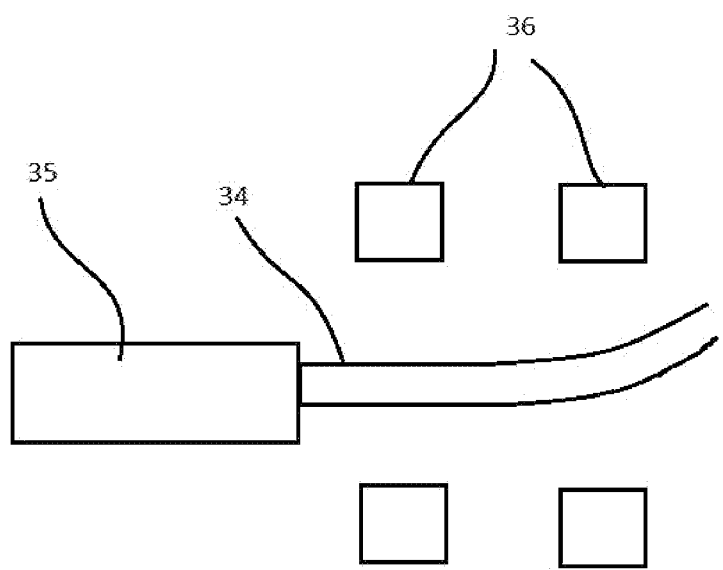

FIG. 12 schematically shows sealing apparatus according to a third embodiment of a sealing apparatus aspect of the present invention mounted on a robot;

FIG. 13 shows part of the apparatus of FIG. 12 in greater detail;

FIG. 14 is a flow chart showing the operation of the third embodiment;

FIGS. 15A to 15D are explanatory views showing forces experienced as a result of joint movement;

FIGS. 16 and 17 are a flow chart and cut-away perspective view, respectively, showing the operation of an embodiment applied to repairing a crack; and FIGS. 18A and 18B show an embodiment according to a sealant delivery aspect of the present invention.

Figure 5:
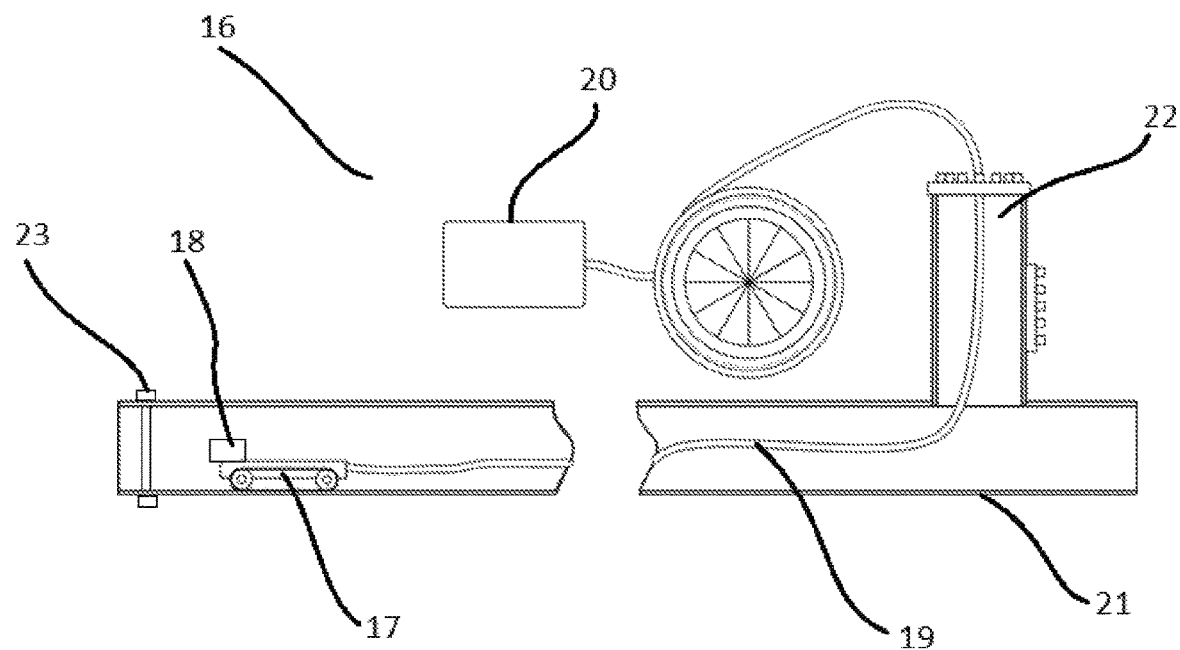
FIG. 5 is a schematic view of an embodiment of a sealing system aspect of the present invention.

FIG. 5 shows generally at 16 a robotic pipe repair system according to an embodiment of a sealing system aspect of the present invention. The robotic pipe repair system 16 comprises a robot 17 which carries sealing apparatus 18 according to an embodiment of a sealing apparatus aspect of the present invention and which is linked via an umbilical 19 to an on-surface metering pump unit 20. The robot 17 may be introduced into the pipeline 21 via an access point 22, after which the robot 17 is remotely operable from the surface to move to and access pipe joints 23 from the interior of the pipeline 21. The robot 17 is also provided with a suitable camera (not shown) to enable the location of the pipe joints 23 to be identified e.g. by an operator at surface level. The pipeline 21 in the present embodiment is illustrated as being horizontal, but it is to be understood that the robot 17 may be operated to move within pipelines of any orientation e.g. sloping or vertical.

The umbilical 19 is used to supply liquid sealant material to the robot 17. The liquid sealant material may comprise a sealant or adhesive. In the present embodiment, the liquid sealant material comprises a low-viscosity (below 3000 cP), Ultraviolet (UV)-curable liquid sealant material, which may be permanently cured (i.e. solidified) by the application of UV light. UV-curable sealant materials suitable for use in the present embodiment are for example manufactured by Permabond of Winchester, United Kingdom.

In addition to liquid sealant, the umbilical 19 is also used to supply electrical power to the robot 17, together with the necessary command signals to control movement of the robot 17 within the pipeline 21. The umbilical 19 may also be used to retrieve the robot 17 in the event of failure.

Robots suitable for use in the present system include, for example, the CISBOT robot manufactured by ULC Robotics of Hauppauge, N.Y. 11788, USA, the Versatrax Crawler System manufactured by Inuktun Services Ltd of Nanaimo, British Columbia, Canada, and the Covercat 900 Series Pipe Snake manufactured by Hyperion Equipment Ltd of Stockton-on-Tees, United Kingdom.

Figure 6:
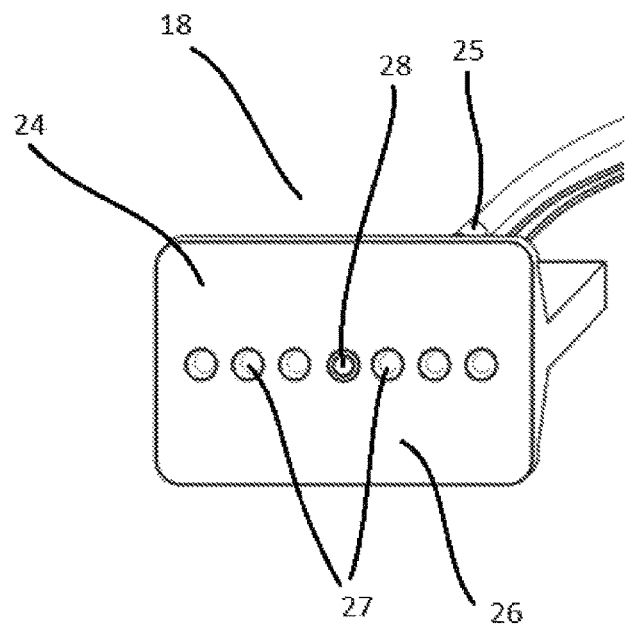
FIG. 6 is a view showing a first embodiment of a sealing apparatus aspect of the present invention.

Sealing apparatus 18 according to a first embodiment of a sealing apparatus aspect of the present invention is shown in FIG. 6, and comprises a baffle 24 to which a nozzle 25 and a UV-light source (shown generally at 26) comprising an array of UV-light emitting LEDs 27 are mounted. The baffle 24 of the present embodiment is planar and substantially rectangular, and is flexible, preferably being of flexible polyurethane, although other suitable materials may be used e.g. an epoxy material or similar. In the present embodiment, both the outlet 28 of the nozzle and the LEDs 27 are located flush with a front surface of the baffle 24, with ones of the LEDs 27 mounted adjacent to and on either side of the nozzle outlet 28. In the present embodiment, the array comprises a total of six LEDs 27, although a greater or lesser number of LEDs may be used, including a single LED, depending upon the operational requirements of the sealing apparatus 18.

Operation of the sealing apparatus 18 of the first embodiment will now be described with reference to FIGS. 7, 8 and 9.

Figure 7:
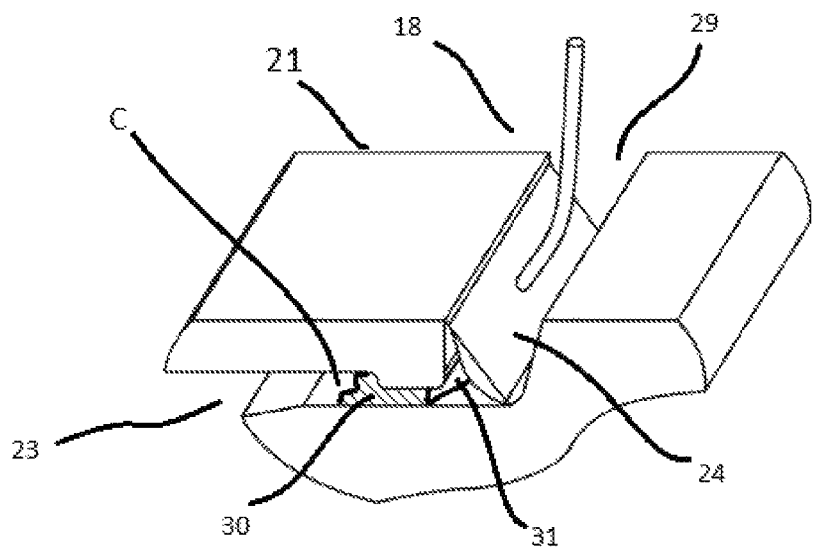
FIG. 7 is a perspective view showing the sealing apparatus of FIG. 6 during a joint seal repair operation.
Figure 8:
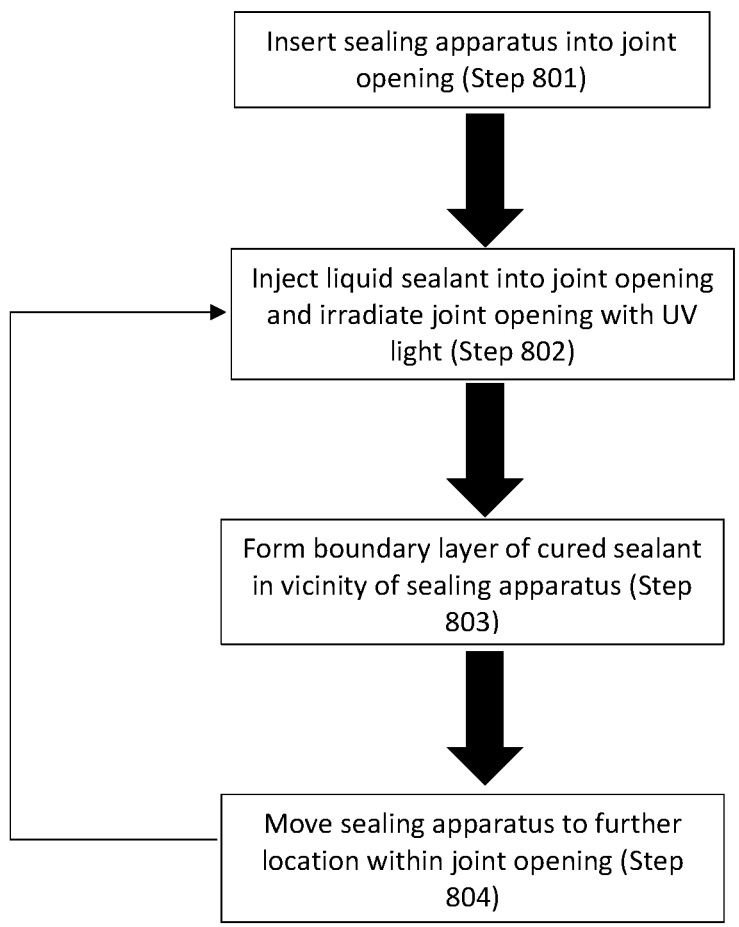
FIG. 8 is a flow chart showing operation of the first embodiment.

Once the robot 17 is located within the pipeline 21 and moved to a position adjacent a first joint 23 to be repaired, the sealing apparatus 18 is inserted into the joint opening 29 on the interior side of the pipeline 21, as shown in FIG. 7 and as indicated by step 801 in the flow chart of FIG. 8. The sealing apparatus 18 may for example be carried by the robot 17 using a movable arm (not shown) to facilitate insertion of the sealing apparatus 18 into the joint opening 29, and the proper insertion of the sealing apparatus 18 into the joint opening may optionally be confirmed using the camera (not shown) also carried by the robot 17. The flexible material of the baffle 24 of the present embodiment enables it to adapt to the joint opening 29 e.g. by bending, and may for example adopt a substantially U-shaped cross-sectional profile upon further insertion into the joint opening 29.

UV-curable liquid sealant material, supplied to the robot 17 via the umbilical 19, is then injected into the joint opening 29 from the nozzle outlet 28 of the sealing apparatus 18. Simultaneously, the UV-emitting LEDs 27 are powered to irradiate the joint opening 29 with UV light in the vicinity of the sealing apparatus 18 (step 802).

As noted above, the liquid sealant 30 of the present embodiment has a low viscosity (below 3000 cP) and accordingly readily flows into the cavity C of the joint 23 via the joint opening 29. However, the nature of the joint opening 29 means that injected liquid sealant 30 will be free to run back out of the joint opening 29 and into the pipeline 21; this is particularly the case for a low viscosity sealant, as in the present embodiment.

Figure 1:
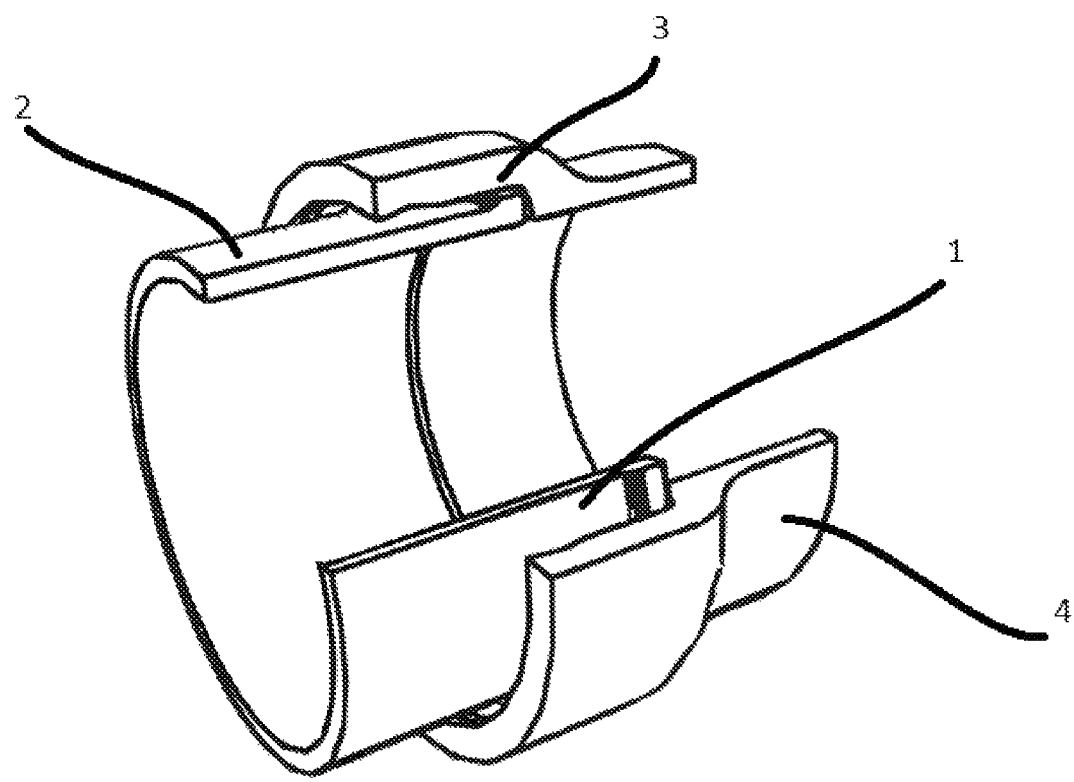
FIG. 1 is a cut-away perspective view of a typical socket and spigot joint.
Figure 2:
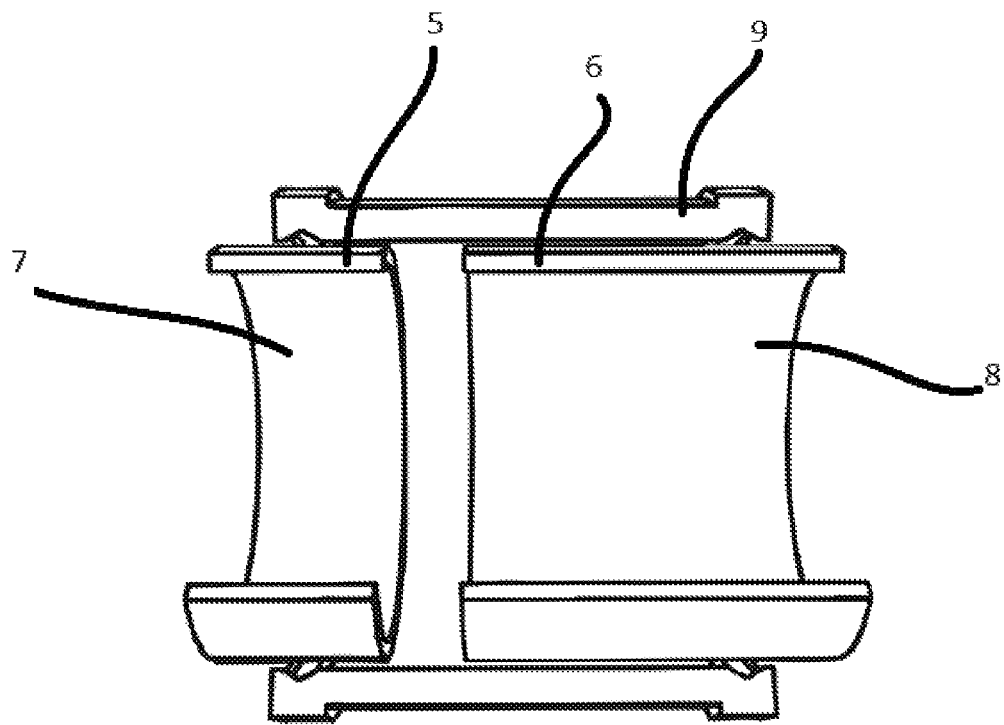
FIG. 2 is a cross-sectional view through a typical collar joint.
Figure 3:
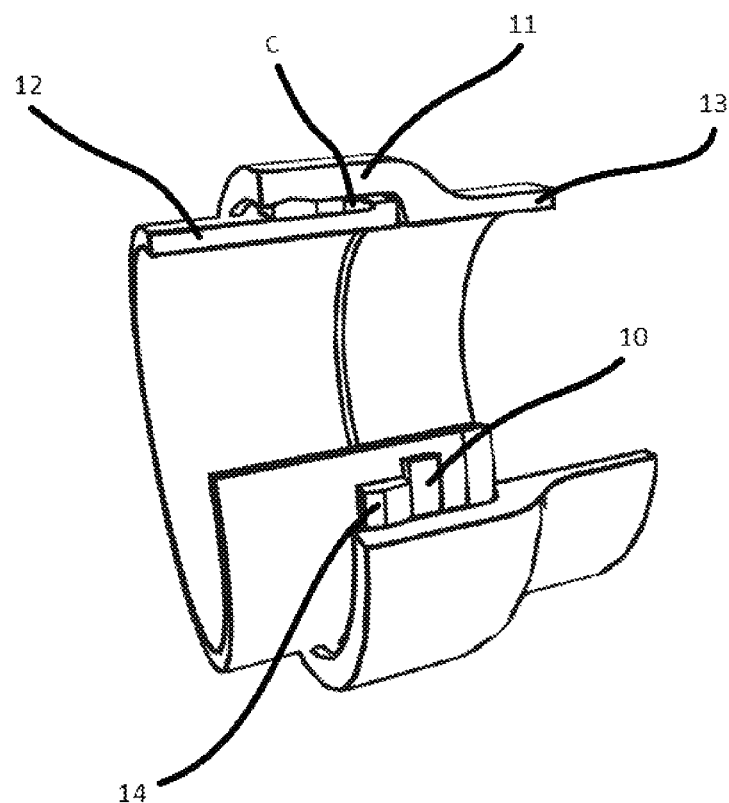
FIG. 3 is a cut-away perspective view schematically illustrating a lead-yarn seal.
Figure 4:
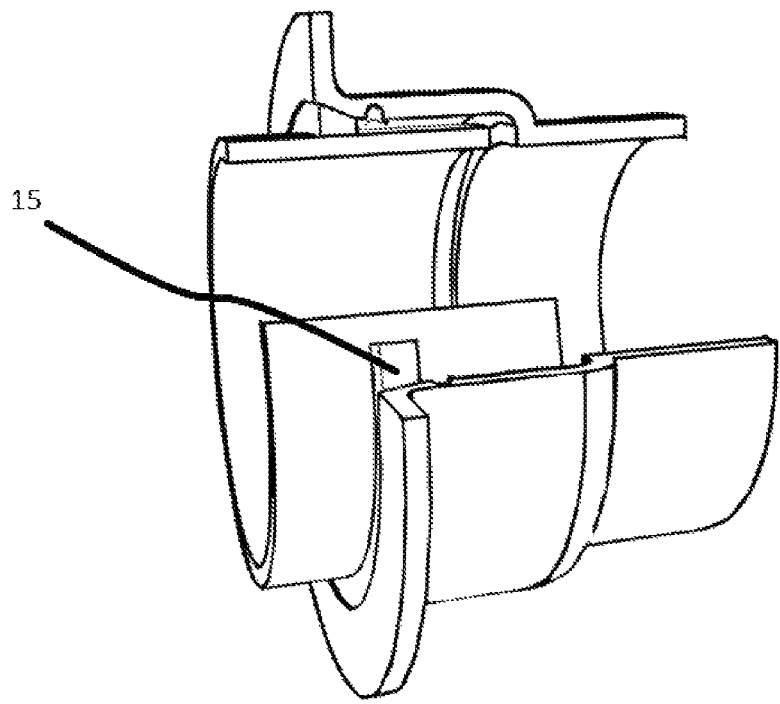
FIG. 4 is a cut-away perspective view showing a typical mechanical joint.
Figure 9A:
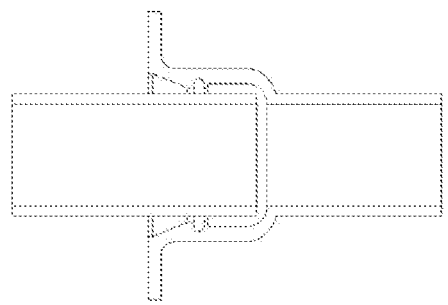
FIGS. 9A to 9E are explanatory views showing the preferential flow path of liquid sealant injected into a joint.
Figure 9B:
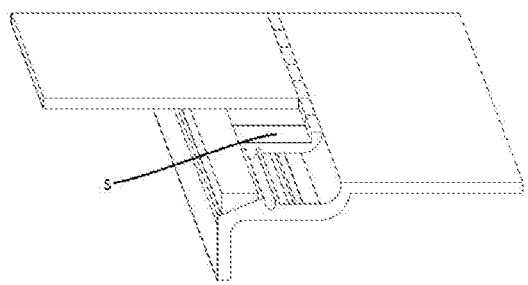
Figure 9C:
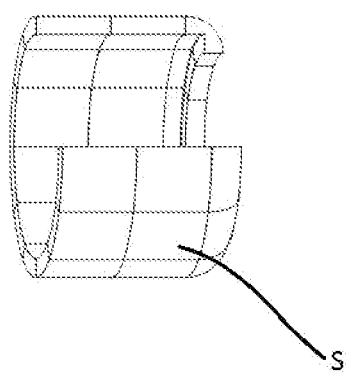
Figure 9D:
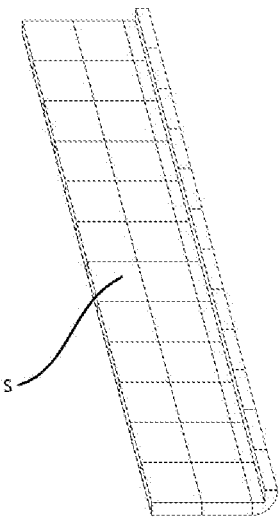
Figure 9E:
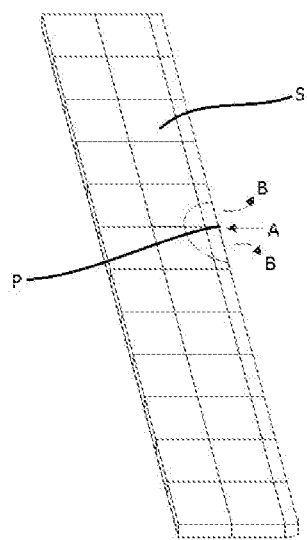

Indeed, the path of least resistance of a sealant injected into a joint is back out of the joint opening itself. This is illustrated by FIGS. 9A to 9E. FIG. 9A is a cross-sectional view through a typical mechanical joint, similar to that shown in FIG. 4, and FIG. 9B is a detail showing part of the mechanical joint of FIG. 9A in a flat representation, and showing the seal volume profile S (i.e. the joint cavity created between the spigot of the first pipe and the socket of the next) as a hatched area. FIG. 9C is a cut-away perspective view showing the seal volume profile S in isolation, and FIG. 9D shows the seal volume profile S rolled flat. As shown in FIG. 9E, the preferential flow path of liquid sealant injected into the seal volume profile S in the direction indicated by the arrow A at the injection point P is back out of the joint in the direction of the arrows B.

However, any liquid sealant 30 seeking to leave the joint opening 29 in the vicinity of the sealing apparatus 18 will be cured by the UV light emitted from the array of LEDs 27. This results in a cured layer 31 of solidified sealant being created in the vicinity of the sealing apparatus 18 (step 803). This cured layer 31 prevents further liquid sealant 30 from passing out of the joint opening 29 at the injection point, and hence promotes the flow of sealant into the body of the joint cavity. The presence of this cured layer 31 also means that pressure will increase on the liquid sealant 30 as further liquid sealant 30 is injected into the joint opening 29 after the cured layer 31 has been created. This increased pressure results in the uncured liquid sealant material 30 being forced still deeper into the joint cavity C, enabling the joint cavity C to be filled with sealant material to maximise the strength of the seal. The sealing apparatus 18 is then moved (e.g. using a robotic arm, not shown) to further positions around the entire circumference of the joint opening 29 (step 804) whilst the above-described sealant injection and curing process is continued, until a complete seal of the joint opening 29 has been formed. This joint repair process may then be repeated at further joints 23, simply by moving the robot 17 within the pipeline 21 to further joint locations.

The power of the UV light source 26 may be selected to form the cured layer of liquid sealant almost instantaneously e.g. in one second or less. In practice, this means that escape of uncured liquid sealant from the joint opening can be significantly restricted or avoided altogether, even when the liquid sealant 30 is injected directly upwards (and hence, against gravity) into the joint opening 29 at the top of the inside of the pipeline 21.

For example, experimental testing has shown that "UV683" UV-curable sealant, manufactured by Permabond of Winchester, UK, can be cured in around 1 second by application of UV light of sufficient power to result in a received intensity, at the surface of the UV-curable sealant, of 30 W/cm$^2$. The actual received intensity which will be necessary to quickly form a cured layer will depend on a number of factors, including the UV-curable material being used, as well as the speed at which the cured layer is desired to be formed. It is however envisaged that a suitably fast cure will in many circumstances be obtained by application of UV light of sufficient power to result in a received intensity, at the surface of the UV-curable sealant, of 100 mW/cm$^2$. Further UV-curable adhesives and sealants which have been employed in successful testing of an embodiment of the invention include PK51381, PK51201, UV683 and PK20024, all manufactured by Permabond of Winchester, UK; UV7000 and UV2000 manufactured by Sureloc Adhesives Ltd of Barton Upon Humber, UK and Vitralit 6128 and Vitralit 4282 manufactured by Panacol-Elosol GmbH of Steinbach/Taunus, Germany. It is however to be understood that the foregoing are merely examples and by no means limiting, and that embodiments of the present invention may employ a wide range of different UV-curable adhesives and sealants.

Rapid formation of a cured layer may be particularly desirable where a low-viscosity liquid sealant is used, which may be more prone to quickly running back out of the joint opening 29. It is however to be understood that rapid formation of a cured layer will not always be necessary or desirable (e.g. when a higher viscosity sealant material is used which may only flow back out of the joint opening 29 at a slower rate, and/or where a certain amount of sealant leakage back out of the joint opening is acceptable before the cured layer is formed) and the present invention is by no means limited to the rapid formation of a cured layer.

The baffle 24 of the present embodiment further assists in the sealing process by physically directing liquid sealant 30 into the body of the joint opening 29 and away from the interior of the pipeline 21.

In terms of sealant penetration into the joint, testing of an embodiment according to the present invention has demonstrated the liquid sealant 30 injected into the joint opening 29 reaching each of Volumes 1, 2 and 3 of the joint (see FIG. 10), with Volume 3 being adjacent the lead-yarn seal area 10, 14 deep within the joint. That is, the entire joint cavity C may be filled by the liquid sealant 30 (in areas not already occupied by any pre-existing sealing material e.g. from a previous lead-yarn seal), to maximise the strength of the seal.

Figure 10:
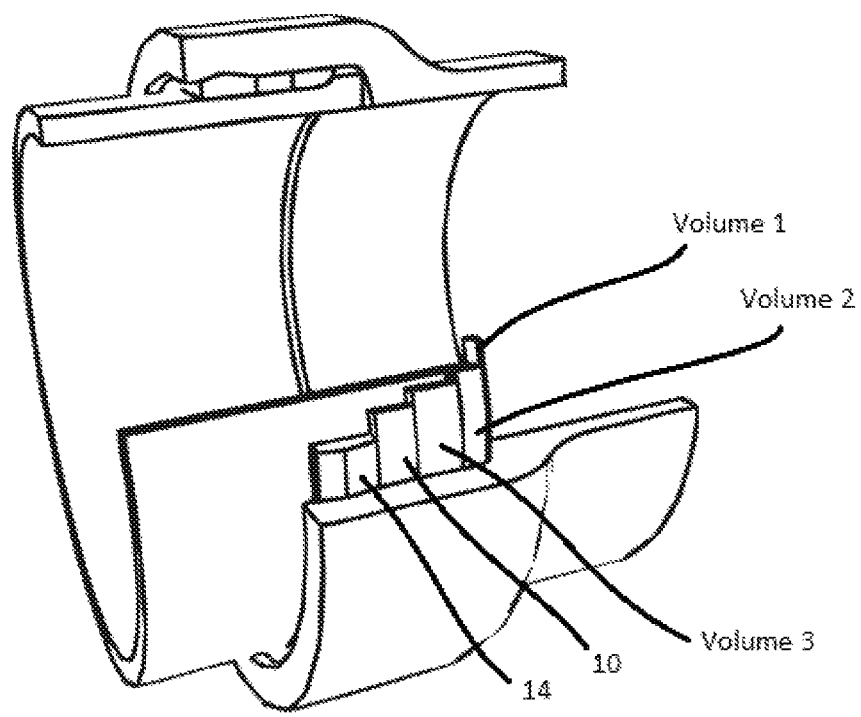
FIG. 10 is a cut-away perspective view showing different regions within an exemplary pipe joint.

Through continued application of the UV light source, it is possible to cure the sealant present at increasing depths into the joint. For example, experimental testing has indicated that, where UV light falls on the joint opening and is not obscured e.g. by the contours of the joint opening, curing of the liquid sealant is possible in Volume 1 and up to the boundary of Volume 2 of the joint cavity as shown in FIG. 10. It is also possible to provide cured sealant at areas deeper within the joint by employing a UV-curable sealant which is also curable by one or more additional curing mechanisms, as discussed in greater detail hereinafter.

However, where the pipeline 21 carries fluid at low pressure (typically 75 mBar or below in a typical gas supply network), it may not be necessary to cure the sealant deeply into the joint, as the mere presence of uncured liquid sealant at increasing depths may be sufficient to preserve the integrity of the seal.

The present embodiment may beneficially be employed whilst fluid (such as gas) is still present in the pipeline 21. This avoids the need to place the pipeline 21 out of service during the joint seal repair process. Additionally, the liquid sealant 30 injected into the joint opening 29 will be preferentially directed towards the leak site by the fluid itself, to enable a seal to be formed at the exact location of the leak. This is particularly facilitated in the present embodiment as a low-viscosity liquid sealant is employed, which will readily flow to the leak site together with fluid escaping from the pipeline.

As will be appreciated, the rapid UV curing process employed in the present embodiment allows for a low-viscosity (i.e. less than 3000 cP) liquid sealant to be employed whilst minimising or avoiding altogether liquid sealant running back into the pipeline. It is envisaged that a target viscosity of 1500 cP for the liquid sealant will be routinely achievable according to embodiments of the present invention, however viscosities as low as 100 cP have been successfully deployed in testing to seal a joint using the UV curing technique according to an embodiment of the present invention. As noted above, it is however to be understood that rapid formation of a cured layer will not always be necessary or desirable (e.g. when a higher viscosity sealant material is used which may only flow back out of the joint opening 29 at a slower rate, and/or where a certain amount of sealant leakage back out of the joint opening is acceptable before the cured layer is formed) and the present invention is by no means limited to the rapid formation of a cured layer.

The use of a low viscosity sealant maximises the effectiveness of the seal, as a low viscosity sealant will act to completely fill the joint cavity by readily wicking into available cracks and gaps in the joint. Further, the use of a low-viscosity sealant facilitates sealant delivery to the robot 17 via the umbilical 19, as lower viscosity sealants are more easily pumped along the umbilical 19. This can also allow for longer lengths of umbilical 19 to be used, enabling the robot 17 to be deployed to joints 23 further from the access point 22. At the same time, the tendency of the low viscosity sealant to run back out of the joint opening 29 and back into the pipeline 21 during the sealing process is reduced or avoided altogether, owing to the rapid formation of a cured layer 31 of sealant. However, use of higher-viscosity sealants may be acceptable or preferable, depending upon operational requirements, and the present invention is by no means limited to the use of low viscosity sealants.

Although the present sealing apparatus 18 is provided with a single nozzle 25 and light source 26, according to further variants, also being embodiments of the present invention, it may instead be provided with a plurality of nozzles 25 and a corresponding plurality of light sources 26, wherein each light source 26 irradiates an area in the vicinity of a respective one of the plurality of nozzles 25. This may beneficially decrease the time necessary to seal a given joint opening 29, and/or may be useful where a particularly large joint cavity needs to be filled.

Figure 11:
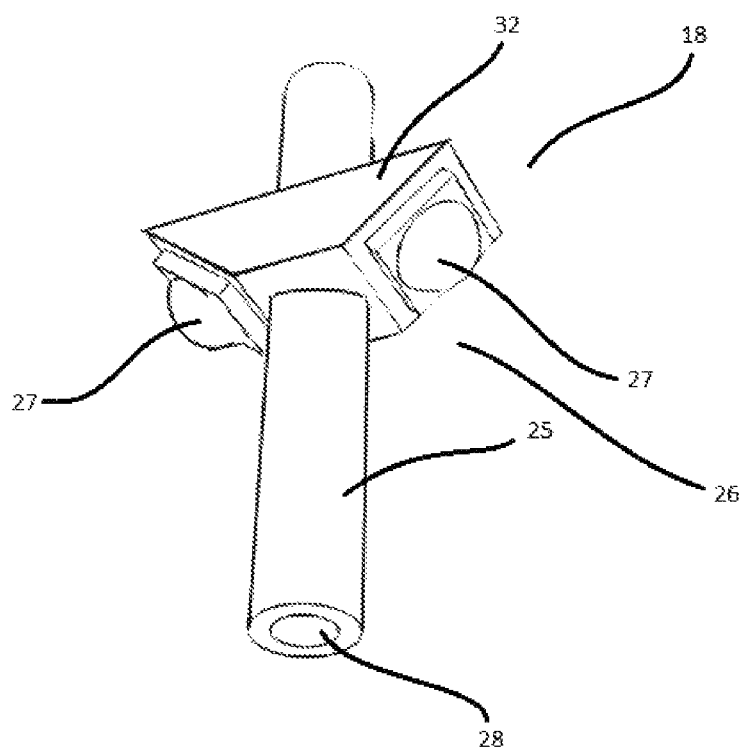
FIG. 11 is a view showing a second embodiment of a sealing apparatus aspect of the present invention.

Sealing apparatus 18 according to a second embodiment of a sealing apparatus aspect of the present invention will now be described with reference to FIG. 11, in which like parts are given the same reference numerals.

In the present embodiment, the baffle is omitted and the sealing apparatus 18 comprises a nozzle 25 to which a UV light source 26 is attached so as to be adjacent the nozzle 25. In the present embodiment, the UV light source 26 comprises a pair of UV LEDs 27 on a housing 32 mounted to a rearward part of the nozzle 25, such that the nozzle outlet 28 is located forwardly of the UV light source 26. This allows for the nozzle 25 to be inserted further into the joint opening 29. The UV LEDs 27 are arranged to illuminate in the circumferential plane of the joint. In the present embodiment, the UV LEDs 27 are high-powered, each being a 5W LED. This need not be the case, however, and different power LEDs, as well as a greater or lesser number of LEDs, may be employed as desired.

The sealing apparatus 18 of the present embodiment may be mounted to the robot 17 in place of the sealing apparatus 18 of the first embodiment, and the operation of the sealing apparatus 18 of the present embodiment is the same as for the first embodiment described above in relation to FIG. 8.

As with the first embodiment of sealing apparatus 18 described above, the present embodiment of sealing apparatus 18 may, according to further variants also being embodiments of the present invention, instead be provided with a plurality of nozzles 25 and a corresponding plurality of light sources 26, wherein each light source 26 irradiates an area in the vicinity of a respective one of the plurality of nozzles 25. This may beneficially decrease the time necessary to seal a given joint opening 29, and/or may be useful where a particularly large joint cavity needs to be filled.

Sealing apparatus according to a third embodiment of a sealing apparatus aspect of the present invention will now be described with reference to FIG. 12, in which like parts are given the same reference numerals.

The sealing apparatus of the present embodiment, shown generally at 18 in FIG. 12, again comprises a nozzle 25 for ejecting liquid sealant and a UV light source 26. However, unlike the first and second embodiments, in which the UV light is directed locally at the sealant injection point, the UV light source 26 of the present embodiment is instead arranged to irradiate the joint opening 29 over a wider area, in a floodlit manner. In particular, in the present embodiment, the UV light source is arranged to produce a band of UV light which extends completely around the inner circumference of the pipeline 21, so as to irradiate the entire joint opening 29, as shown in FIG. 13. This is achieved in the present embodiment by providing a plurality of UV lights 27 (which may for example comprise UV LEDs) at regular intervals around the entire outer circumference of a UV light source support member 33. The support member 33 is preferably mounted to the robot 17 so as to be located at a radially central position within the pipeline 21, to create an even UV intensity distribution around the joint opening 29.

The nozzle 25 of the present embodiment is located separately from the UV light source 26, and is mounted to the robot 17 (e.g. using a movable arm, not shown) to permit its selective insertion into joint openings 29 present on the interior side of the pipeline 21.

Operation of the present embodiment will now be described, with reference to FIG. 14.

Once the sealing apparatus 18 of the present embodiment has been moved into the region of a pipe joint 23 of the pipeline 21 using the robot 17, the nozzle 25 is inserted into the internal opening 29 of the pipe joint at a desired insertion point, such as at the bottom of the pipeline interior (step 1401). Once the nozzle 25 is in place, liquid UV-curable sealant, preferably of a low viscosity (under 3000 cP) in view of the benefits outline above, is then injected from the nozzle 25 into the opening of the pipe joint, and the UV light source 26 is operated so as to irradiate the entire internal pipe joint opening 29 with UV light (step 1402). In the same way as the first and second embodiments, liquid sealant seeking to escape from the pipe joint opening 29 will be cured by the UV light source 26 to form a cured layer which will prevent further liquid sealant from escaping from the joint. In the present embodiment, the entire joint opening is irradiated by the UV light source 26, meaning that it is not necessary to move the nozzle 25 around the joint opening 29. Rather, the nozzle 25 may be kept in position at a single insertion point, as liquid sealant seeking to escape from any point of the joint opening 29 as the joint cavity C fills with liquid sealant will be cured by the UV light source 26 (step 1403).

Preferably, the nozzle 25 is inserted at the bottom (i.e. lowest point) of the joint opening 29. This acts to maximise the quality of the seal, as injected liquid sealant will then tend to flow laterally, deep into the joint cavity C, before increasing pressure forces the sealant against gravity to flow to increasingly higher levels within the joint cavity C. In this manner, the sealant can be injected at a single point into the joint opening 29 to completely fill vacant areas within the joint cavity C, with the cured layer forming a wall as the height of the sealant within the joint cavity C increases. However, a seal may equally be created by inserting the nozzle 25 at other points within the pipe joint opening 29, including at the top of the pipeline 21, as well as at the sides.

According to a variant, also being an embodiment of the present invention, sealing apparatus of the present embodiment may also be provided with one or more additional nozzles (not shown), which enables the sealing apparatus 18 to inject liquid sealant into the joint opening 29 at a plurality of locations, simultaneously. This may beneficially decrease the time necessary to seal a given joint opening 29, and/or may be useful where a particularly large joint cavity C needs to be filled. As the UV light source 26 illuminates the entire joint opening 29 in a floodlit manner in the present embodiment, it is not necessary to provide any further light sources to cure liquid sealant leaking back from the joint opening 29 following ejection from the plurality of nozzles 25, although plural light sources 26 may be provided, as desired. Further, plural lights sources 26 may be provided to illuminate the entire joint opening 29, irrespective of whether or not a plurality of nozzles 25 are provided.

Although the above described embodiments utilise a UV light source and a UV-curable sealant, other light sources may instead be used according to further embodiments of the present invention, such as infra-red (IR) light sources and visible light sources, in combination with a sealant curable by the light source employed. In the present specification, "light" is accordingly to be interpreted as including any and all of UV light, IR light and visible light, and references to "light-curable material", "light source" and similar are to be interpreted accordingly.

More generally, embodiments of the present invention may employ any electromagnetic radiation source e.g. light or heat, as appropriate to cure the liquid sealant selected for a given application.

In still further embodiments, the curing of liquid sealant may be performed in ways other than the application of electromagnetic radiation. For example, where a two-part additive-based sealant is used, in which a second chemical component or activator is added to the liquid sealant to perform curing, the second chemical component or activator may be selectively applied around an opening to be sealed, so as to cure the sealant seeking to escape from the opening.

In addition to being curable by a primary curing mechanism such as light curing, the sealant used may according to further embodiments also be curable by one or more additional curing mechanisms e.g. one or more of an anaerobic curing process, curing with moisture, curing with heat, an addition-type curing process which is triggered by adding a second chemical component and/or activator to the liquid sealant, any other suitable additional curing mechanism, and any combination of the foregoing. In the case of the above-described embodiments, use of a sealant curable by one or more additional curing processes will allow it to be cured at regions deeper into the joint cavity C which would not otherwise be reached by UV light from the UV light source 26. This may be used to provide an enhanced and/or longer lasting seal.

Figure 15A:
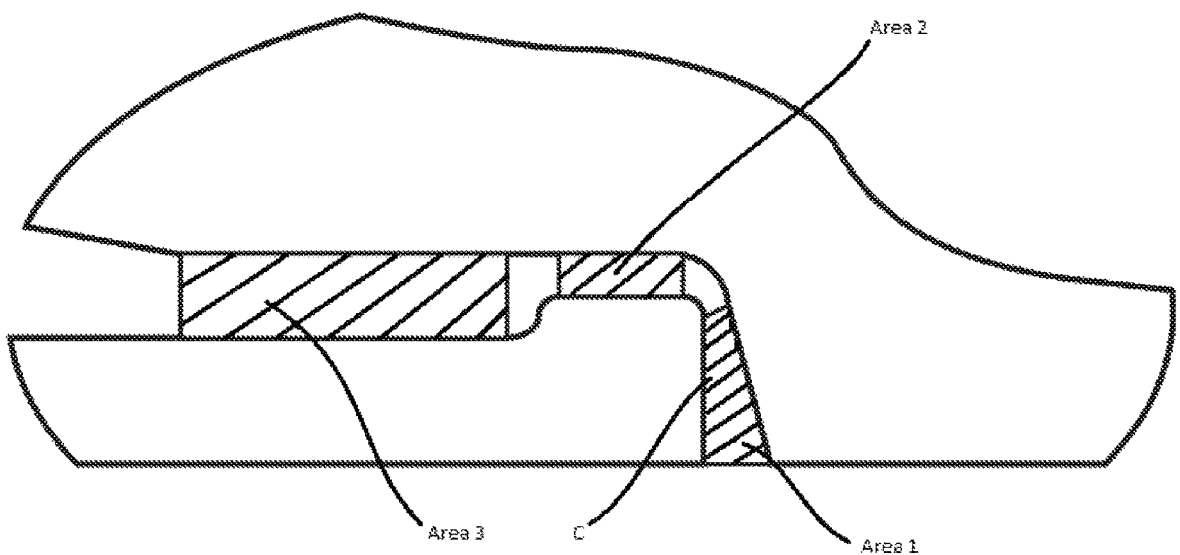
Figure 15B:
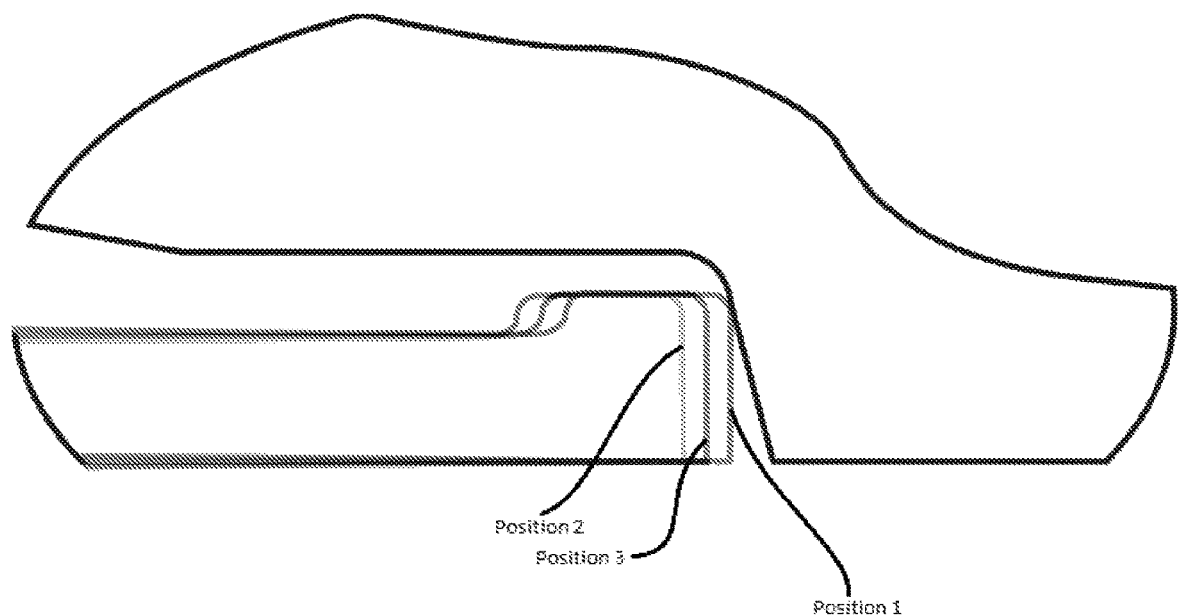
Figure 15C:
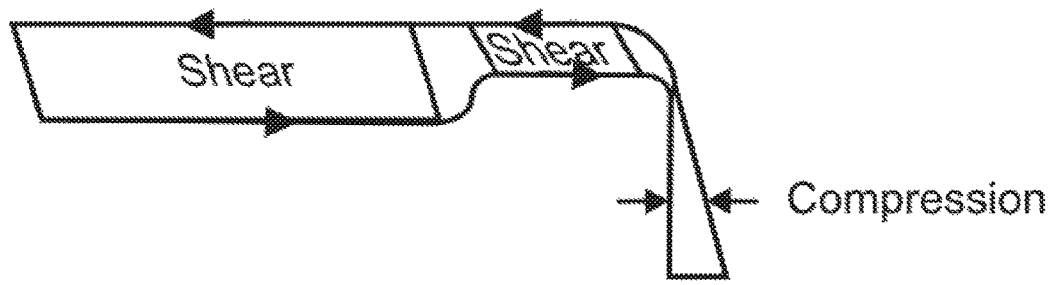
Figure 15D:
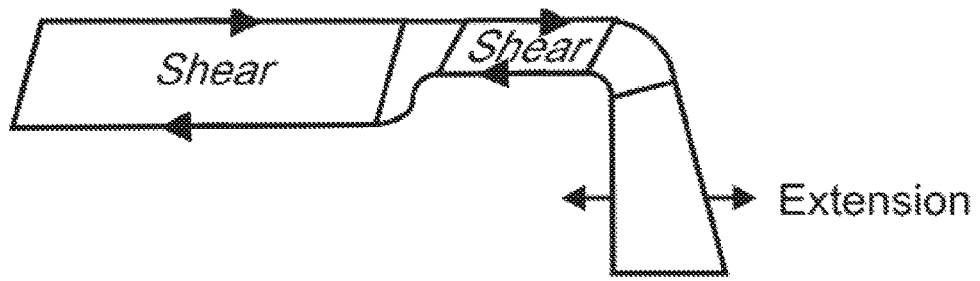

In particular, the cross-section of the joint cavity C shown in FIG. 15A may generally be considered as comprising three areas, labelled as Area 1, Area 2 and Area 3 in the Figure, with boundary regions present on either side of Area 2. Movement of the joint in use (e.g. caused by expansion and contraction and/or loading from traffic etc.) can result in joint movement to and from positions 1 and 2 shown in FIG. 15B from the usual resting position 3 mid-way between these extremes. As shown by FIGS. 15C and 15D, this movement results in cured sealant present at Area 1 to be subject to compression and extension forces, which can degrade the seal by causing the cured sealant at Area 1 to peel away from the joint over time. On the other hand, cured sealant present at Areas 2 and 3 will instead be subject to shearing forces which are less likely to result in cured sealant peeling away from the joint, meaning that the seal provided at those areas will typically have a longer useful lifespan. This is particularly the case for cured sealant present at Area 3, which is subject to lower shearing forces than is experienced by cured sealant at Area 2.

Preferably, the one or more additional curing processes is/are slower acting than the primary curing process. For example, an additional anaerobic curing process will typically take between 1 and two hours to form an initial cured surface or "skin", and 2 to 3 weeks to cure completely. The use of a significantly slower additional curing process(es) will permit liquid sealant to reach deeper into the joint e.g. to Areas 2 and 3 in FIG. 15A, before being cured over time by the additional curing mechanism, further enhancing seal strength.

As noted above, the one or more additional curing mechanisms may for example include one or more of an anaerobic curing process, curing with moisture, curing with heat, an addition-type curing process which is triggered by adding a second chemical component or activator to the liquid sealant, or any other suitable additional curing mechanism.

As a leak site will enable dampness to enter the pipeline at the leak site, using a sealant which is curable by an additional moisture curing process beneficially means that the additional curing process will be triggered at the leak site itself, thus providing a seal directly at the leak site.

As for addition-type curing processes, a secondary curing process which is catalysed by the addition of metal ions may be selected in the case of sealing metal pipes such as iron or steel pipes. This is beneficial, as corrosion typically results in iron or steel pipes building up a layer of so-called "black powder", which is predominantly iron oxide, and is rich in metal ions. The metal ions from the black powder may therefore be used to catalyse the secondary anaerobic curing process, and to encourage the sealant to solidify and hence bind with the pipeline where the metal has corroded, further enhancing the seal. The robot 17 may also be provided with means (not shown) to scrape or otherwise obtain black powder from the interior surface of the pipeline and to mix the obtained black powder with the liquid sealant 30 prior to injection into the joint opening. This enables the additional curing process to be triggered by metal ions conveniently obtained from the black powder.

The foregoing embodiments have been described with reference to specific application in joint sealing and repair, and more specifically in sealing and repairing pipe joints in fluid-carrying pipelines such as gas pipelines. It will however be appreciated that the invention may be applied to sealing other pipeline leak sources, such as cracks or holes in a pipeline wall, or for example in sealing in the vicinity of a "cotter plate" repair to a pipeline, wherein a plate is bolted over a leak source area of a pipeline. In these types of applications, a suitable sensor array, user-operated camera or other device may be used to help identify the location of the crack, hole or other opening and/or gap between two bodies (e.g. a gap in the joint between the pipeline wall and a "cotter plate" repair plate). In embodiments employing a robot 17, the robot 17 may beneficially be provided with the sensor array, camera or other device for identifying the location of the crack or other opening.

Once the location of the crack or other opening has been identified, the foregoing processes are simply modified to conduct a repair accordingly.

For example, if using the robotic pipe repair system 16 shown in FIGS. 5 to 7 to repair a crack, the flow chart of FIG. 8 may be generally followed, but applied to repair the crack instead of a pipeline joint. Specifically, and as shown in FIGS. 16 and 17, crack repair may be conducted by moving the sealing apparatus 18 into contact or close proximity with a crack Cr in a pipeline 21 (Step 1601), injecting liquid sealant into the crack Cr whilst irradiating the crack Cr with UV light (Step 1602) and forming a boundary layer of cured sealant in the vicinity of the sealing apparatus 18 (Step 1603). If the crack is entirely covered by the area illuminated by the array of UV LEDs 27, performance of Steps 1601 to 1603 should repair and seal the crack. However, assuming that the crack Cr extends by a distance which is greater than the area illuminated by the array of UV LEDs 27 (as is the case in FIG. 17), the sealing apparatus 18 may then be moved to a further location along the crack Cr (Step S1604), with Steps S1601 to S1604 being repeated as necessary until a satisfactory crack repair is achieved.

Similarly, if for example the sealing apparatus 18 of FIGS. 12 and 13 is used e.g. in the repair of a crack, the process of FIG. 14 may generally be followed, but with Step S1401 modified by bringing the sealing apparatus 18 into contact or close proximity with the crack, instead of inserting the sealing apparatus 18 into a joint opening.

Yet further, embodiments of the invention may be applied in other areas going beyond pipelines, such as in repairing or sealing joints, cracks and other openings in articles and structures in general, and not merely pipelines alone. Also, embodiments of the invention may for example be employed in the filling of labyrinthine cavities in structures other than pipelines, whilst preventing sealant extruding back from the cavity opening.

A method embodying a sealant material delivery aspect of the present invention will now be described with reference to FIGS. 18A and 18B.

According to the present embodiment, a stream of UV curable liquid sealant material 34 (such as a UV curable sealant or adhesive) is ejected from a nozzle 35 into a region surrounded by a plurality of UV lights 36 (for example, UV emitting LEDs). The intensity of UV light produced by the surrounding UV lights 36 is adjusted to selectively harden the exterior of the ejected stream of UV curable material 34 into a cured layer extending partly or completely around the outer circumference of the stream of sealant. In this way, the ejected sealant material 34 can be formed into a tube which acts as an extension of the sealant nozzle 35. The illumination from the UV lights 36 is however such that the sealant nozzle 35 does not become blocked by cured sealant. In particular, the illumination from the UV lights 36 is such that UV light does not enter the sealant nozzle 35 itself; a baffle or shade may optionally be provided to guard against this occurrence.

The direction of the tube can be affected by suitable control of the intensity of the UV lights 36 surrounding the tube, enabling the tube to be selectively steered as desired, as shown in FIG. 14B, as the tube will act to move away from the most intense UV light source incident upon it.

In this manner, the sealant material 34 may itself be used to dynamically form the boundary of the vessel containing the uncured sealant material. In the present embodiment, this vessel is a tube, although this need not be the case, and suitable control of the UV lights 36 may be employed to dynamically create other shaped vessels. According to the present embodiment, it is also possible to direct the ejected sealant material by curing only a portion of the surface of the ejected sealant material 34. For example, by suitable control of the UV lights 36 it is possible to cure (i.e. harden) the stream of ejected sealant material on just one side. This results in the stream bending away from the light causing the hardening.

In a variant, a single UV light 36 is employed in the present embodiment, rather than a plurality of UV lights. The single UV light my for example be movable around the stream of ejected sealant material 34, to preferentially cure the surface of the stream of ejected sealant material 34 and hence direct its movement as described above.

The present embodiment, and its variant described above, may for example be used to facilitate the penetration of the sealant deep into a volume to be filled. This can also be used, for example, when joining two bodies or filling a cavity between two bodies where the cavity is open in more than one place. Although the present embodiment employs a UV-light source, other light sources including IR and visible light sources may instead be used, in combination with a sealant material 34 curable by the light source used. In still further embodiments, other curing mechanisms may be used instead of a light-based curing mechanism e.g. a heat-based curing mechanism.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Thus, the foregoing embodiments of the invention have been described by way of example only. It will be appreciated by a person skilled in the art that various modifications can be made without departing from the scope of the invention as defined by the claims.

The invention claimed is:

1. A sealing method, comprising:
   introducing a moving stream of curable material into an opening; and
   curing a portion of the moving stream of the curable material flowing back out of the opening to form a cured skin of the curable material, wherein the cured skin restricts or prevents at least a further portion of the curable material from flowing back out of the opening; and
   introducing additional curable material into the opening behind the cured skin after the cured skin has been formed.

2. The method of claim 1, wherein said curing comprises applying electromagnetic radiation to the portion of the moving stream of curable material flowing back out of the opening.

3. The method of claim 2, wherein the curable material comprises light-curable material, and said applying electromagnetic radiation comprises irradiating the portion of the moving stream of light-curable material flowing back out of the opening with light to form the cured skin of light-curable material, wherein the moving stream of curable material is introduced into the opening using at least one nozzle, and wherein at least one light source is provided adjacent the at least one nozzle to locally irradiate a portion of the moving stream of light-curable material in the vicinity of the at least one nozzle.

4. The method of claim 3, wherein introducing the moving stream of light-curable material into the opening comprises using the at least one nozzle to introduce a moving stream of light-curable material into the opening in turn at plural locations of the opening, and wherein the method further comprises moving the at least one nozzle and the at least one light source between the plural locations.

5. The method of claim 2, wherein the curable material comprises light-curable material, and said applying electromagnetic radiation comprises irradiating the portion of the moving stream of light-curable material flowing back out of the opening with light to form the cured skin of light-curable material, wherein at least one light source is provided to irradiate the entire opening, and wherein the moving stream of light- curable material is introduced into the opening at a single location of the opening to form a cured skin around the entire opening.

6. The method of claim 5, wherein the opening comprises the opening of a joint on an interior side of a pipeline.

7. The method of claim 1, wherein the curable material has a viscosity below 3000 cP.

8. The method of claim 1, wherein said curing is performed using a first curing process, and the curable material is also curable by at least one additional curing process.

9. The method of claim 8, wherein the at least one additional curing process is slower acting than the first curing process.

10. The method of claim 8, wherein the at least one additional curing process is catalysed by metal ions, wherein the opening is provided in a metal body or structure, and wherein the method further comprises removing corroded material from a surface of the metal body or structure and mixing the corroded material with the curable material prior to said introducing a moving stream of curable material into the opening.

11. A sealing apparatus, comprising:
    at least one outlet which is operable to introduce a moving stream of curable material into an opening; and
    a curing apparatus operable to cure a portion of the moving stream of the curable material flowing back out of the opening to form a cured skin of the curable material which restricts or prevents at least a further portion of the curable material from flowing back out of the opening; and
    wherein the at least one outlet is further operable to introduce additional curable material into the opening behind the cured skin after the cured skin has been formed.

12. The sealing apparatus of claim 11, wherein the curing apparatus comprises at least one source of electromagnetic radiation, wherein the at least one source of electromagnetic radiation comprises at least one light source which is operable to irradiate the portion of the moving stream of curable material flowing back out of the opening to form the cured skin of curable material, and wherein the at least one light source is provided adjacent the at least one outlet to locally irradiate an area in the vicinity of the at least one outlet.

13. A sealing system, comprising:
   the sealing apparatus according to claim 11 or claim 12; and
   a movable platform which carries the sealing apparatus.

* * * * *